June 27, 1961 W. T. RENTSCHLER 2,989,906
PHOTOGRAPHIC OR CINEMATOGRAPHIC CAMERA
Filed May 21, 1959
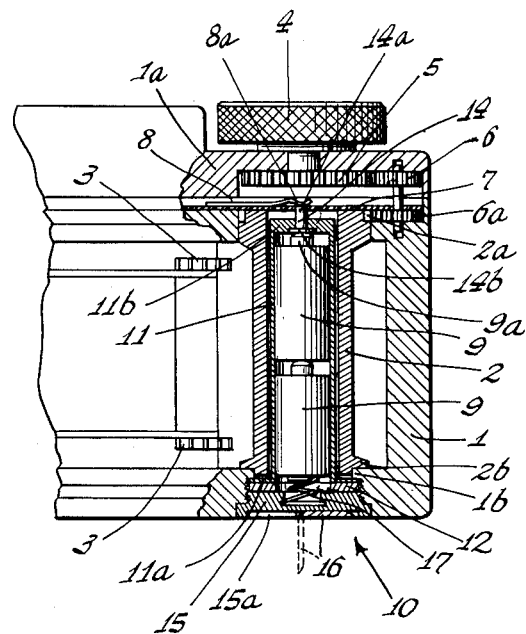
INVENTOR.
Waldemar T. Rentschler
BY
Munn, Liddy, Daniels & March
ATTORNEYS

United States Patent Office 2,989,906
Patented June 27, 1961

2,989,906
PHOTOGRAPHIC OR CINEMATOGRAPHIC CAMERA
Waldemar T. Rentschler, Calmbach (Enz), Germany, assignor to Alfred Gauthier, G.m.b.H., Calmbach (Enz), Germany, a corporation of Germany
Filed May 21, 1959, Ser. No. 814,787
Claims priority, application Germany May 28, 1958
5 Claims. (Cl. 95—11)

This invention relates to photographic or cinematographic cameras of the type having at least one film spool provided with a central hollow space or bore to accommodate a source of electric current such as a battery, which is to be connected with an electric circuit carried by the camera housing.

In connection with cameras a source of electric current, as for example a dry cell or an accumulator, finds various uses as in flash photography, automatic control of the exposure, or as a power source to energize adjusting motors for the setting members. The location of such source of current in the central hollow area or bore of a film spool represents a desirable and advantageous solution of the problem of finding suitable and adequate space.

Prior to the present invention all well known cameras of the above type have had a disadvantage in common. This disadvantage resided in the fact that the installation and replacement of the battery or other current source necessitated opening the entire camera housing to provide access to the film spool, and further necessitated the removal of the said spool from its mounting means. This arrangement constituted a distinct drawback, since when it became necessary to replace a battery the opening of the camera housing would have to be delayed until the film therein was completely used, or else the opening would have to be done under special conditions, as for example in a dark room. As an alternative, the exposed portion of the film could be reeled back into the light-proof cassette before opening the camera housing for replacement of the battery. There was always the danger that opening of the camera housing as required for this purpose, if done carelessly or thoughtlessly, would unnecesarily expose the film in the camera. The operation of reeling back an exposed portion of the film required an appreciable time and also a certain amount of skill, so that the taking of pictures under such circumstance would always be subject to delay.

Furthermore, there always exists the danger that, when subsequently advancing the reeled-back film, the exposed portion thereof will not be properly located due to inaccuracies in the film indicating means, with the result that one or several double exposures may occur, or else that a portion of the film will remain unexposed and unused.

With cameras of the type having rechargeable accumulators as current sources it has already been proposed to provide on the camera housing an electrical connector fitting to enable a charging current to be connected with the accumulator located inside of the film spool. Thus, whenever the voltage of the accumulator dropped off to an unusable value, it could be again restored in a simple manner without opening the camera housing. Even so, an interval of time was required to effect the recharging of the accumulator, and also the necessary equipment must be available. However, with cameras of the type employing dry cells such a solution of the problem is not possible.

The above drawbacks and disadvantages of prior cameras employing sources of electric current are obviated by the present invention, and one object of the invention is to provide a novel and improved camera of the type which utilizes electrical energy, wherein regardless of the particular type of current source employed, an installation, replacement or replenishment of the said current source may be very simply and quickly effected in a manner which does not involve the risk of unintentionally exposing the film in the camera.

In accomplishing the above object, in accordance with the invention, a novel spool and camera housing organization is provided, embracing a rotary mounting for the film spool in conjunction with a closable opening provided in the camera housing at a location which is coaxial with the central space or bore of the spool, to provide access to the said space or bore from the exterior of the camera for the purpose of installing and/or replacing the battery or other current source.

With a camera as above constituted it is possible to easily and quickly install and/or replace any type of battery or current source which is capable of being housed or held in the inside space of the film spool, while at the same time in an unusually simple construction there is prevented any likelihood of the film in the camera being unintentionally exposed, nor is there any necessity for special precautions to be taken such as replacing the battery in a dark room, or reeling back the exposed portion of the film, etc.

Thus, with the camera of the present invention there is involved no delay whatsoever as regards the taking of pictures, due to failure or weakening of the current source or battery, in sharp contrast to prior cameras wherein replacement of the current source is only possible by first opening the entire camera housing or else connecting the enclosed accumulator to a charging device to restore the voltage level. Moreover, in accordance with the invention there is preserved the closed outside form of the camera housing, which is always desirable and of considerable advantage.

In the single figure of the drawings, the invention is illustrated by means of a specific embodiment, which is described in the following specification, wherein the novel features and special, further advantages are set forth.

The single figure is a view partly in axial section and partly in elevation, of a portion of a miniature camera where the film-winding spool is disposed. For the sake of clarity of illustration, the rear of the camera is not shown. The mechanism which cooperates with the film spool, together with the spool and a portion of the camera housing are drawn in section.

As shown, the numeral 1 indicates the housing of a well-known photographic camera. Within the housing 1 there is provided a film winding reel or spool 2, which is turnably mounted but is not shiftable axially. The film in the camera is rolled up on the spool 2, said film being reeled from a well-known type of cassette (not shown) by means of film-winding rollers 3. The winding of the film is effected by turning a film-winding knob or button 4, which is turnably mounted in the upper portion 1a of the camera and which is connected with a geared portion 2a of the spool or reel 2 by means of a driving gear 5 affixed to the shaft which carries the knob 4. The gear 5 engages an idler gear 6 which is on the same shaft with a gear 6a, the latter in turn directly engaging the gear part 2a of the spool 2. As shown, the gears 5, 6 and 6a are disposed within the camera housing 1. The mounting of the spool 2 by which it is prevented from having axial movement is effected by the provision of an external annular shoulder 2b engaging the inner surface of the camera housing 1, and by the provision of a cover plate 7 which is attached to the opposite portion of the camera housing. The cover plate 7 is preferably constituted of a plastic substance which is electrically insulating. On the cover plate 7 there is provided a contact spring 8 which is connected with an electrical circuit in the camera housing (not shown in detail). The contact 8 has a flexible portion 8a which is disposed at the upper end of the spool 2, as seen in the figure. For the purpose of effecting a connection between the contact 8 and the center pole 9a of the uppermost dry cell 9 which is carried within the spool 2, the cover plate 7 is provided with an opening to accommodate a contact member which is described below in detail.

In accordance with the present invention, for the purpose of enabling the dry cell batteries 9 or other sources of current disposed within the film spool 2 to be readily installed and/or replaced, the camera housing 1 is provided with an opening 10 through which the dry cells may pass, said opening being arranged to accommodate a removable closure as further explained below.

By this construction the operation and use of the camera is facilitated and made easier, by virtue of the fact that the dry cells 9 or other sources of current may be very easily and quickly installed within the camera housing and specifically within the spool 2, without requiring opening or dismantling of the camera housing 1 whereby the film disposed therein will be subject to exposure.

In an inexpensive and economical, simple and reliable manner there is provided a light-proof seal within the camera, by which light which might enter the opening 10 when the latter is not closed, will be prevented from passing into the interior of the camera housing 1 externally of the film spool 2 (where such light might undesirably expose the film in the housing). The said advantageous light shield or seal is constituted of a tubular case 11 which extends into the central space or bore of the spool 2 and which is connected with the camera housing 1 about the opening 10 thereof.

In the illustrated embodiment of the invention the case or jacket 11 is provided with an end flange 11a which fits into a shouldered portion at the bottom of the camera housing 1, surrounding the battery replacement opening 10 thereof. The flange 11a abuts a shoulder 1b as shown, and may be secured in such abutting engagement by means of an externally threaded ring nut 12. Thus, the jacket 11 is fixedly attached to the bottom wall of the camera housing 1 and constitutes a light-proof seal, by which light entering the opening 10 will be prevented from reaching the interior of the housing at the outside of the film spool 2.

In place of the securing means comprising the ring nut 12 as illustrated, the light-sealing jacket 11 may be secured to the camera housing in any other suitable fashion, as for example by the use of adhesive strips, glue, or other fastening devices.

In accordance with the present invention the jacket 11 may be constituted of electrically insulating plastic material, thereby simplifying the fabrication of the jacket and effecting desirable manufacturing economies. For cooperation with the electrical contact 8 associated with the electrical circuit which is provided within the camera housing 1 there is provided on the closed end 11b of the jacket 11 a metallic contact part or member 14 having a shank 14a which extends beyond the end of jacket and engages the resilient portion 8a of the electrical contact 8. The contact member 14 further has a flange or head 14b disposed within the end portion 11b of the jacket 11 and adapted to engage the center pole or terminal of the uppermost dry battery 9.

When the jacket 11 is constituted in the above manner, of insulating plastic material as for example polystyrene or the like, there is the advantage that production costs are greatly decreased. With such construction it is not necessary to use special insulation for the metallic contact part 14 which is carried by the closed end 11b of the jacket.

For the purpose of insuring a constant and effective contact between the center pole or terminal 9a of the battery and the contact part 14 there is provided a helical compression spring 17 at the open end of the jacket 11, said spring engaging the bottom surface of the lower battery 9 and also engaging the closure which is provided for the access opening 10 of the casing 1.

In accordance with the present invention the access opening 10 in the camera housing 1 may be provided with an easily operated, advantageous closure in the form of a screw-type breech block or plug. This type of breech block, in contrast with other blocks as for example flap type breeches, sliding breeches and the like has the advantage of simple construction and manufacture, ease of operation and absolute reliability in effecting a secure sealing of the opening 10 against leakage of light.

As may be ascertained from the figure, the screw-type breech block is constituted in the form of a flat closure disk 15, having external screw threads by which it may be screwed into the internally threaded opening 10 in the bottom wall of the camera housing 1, said closure disk being arranged to abut the ring nut 12 which secures the jacket 11 in place.

An especially advantageous, easily grasped and easily operated actuator means is provided on the closure disk 15 to enable the latter to be readily screwed into the camera housing 1 and as readily removed therefrom, said means being constituted as a pivotally mounted or swingable flap-type handle 16, which in the illustrated embodiment of the invention is in the form of a ring. The ring-handle 16 is disposed in a groove 15a provided in the closure disk 15 and is attached to the latter at two diametrically opposite points whereby it may be swung from the retracted inoperative position shown in the drawing to the extended operative position indicated by the broken outline, for the purpose of turning the closure disk.

By the provision of the pivotally mounted ring-shaped handle 16 on the screw-type closure disk 15 there is the advantage that additional or auxiliary fastening or closure or securing means are not required, nor special wrenches or the like, when it is desired to remove the closure for replacement of the batteries 9.

In the illustrated embodiment of the invention the thickness of the ring-shaped handle 16 is made to correspond to the depth of the groove or recess 15a, as shown, thereby to enable the handle to snugly fit in the closure when in its inoperative position, so as to be flush with the outermost surface of the closure disk 15, thereby presenting a smooth exterior surface at the camera housing.

I claim:

1. In a camera, in combination, a camera housing; a hollow film spool rotatably mounted in the housing and having a bore adapted to receive and hold an electric battery; an electric circuit in said housing adapted for connection to said battery, said housing having a closable access opening in one wall, disposed coaxially with respect to the bore of the spool and of larger size than the battery to enable the latter to be placed into and removed from the bore of the spool without opening the entire camera housing.

2. The invention as defined in claim 1 in which there is means including a jacket connected with the camera housing about the access opening thereof and extending into the bore of the film spool, providing a light seal to prevent light from passing into the housing through said opening, said means constituting a holder for the battery.

3. The invention as defined in claim 2 in which the jacket is constituted of insulating plastic substance, said jacket having a closed inner end, and in which there is a metallic contact carried by said closed end and arranged for engagement with the said battery.

4. The invention as defined in claim 1 in which the housing is threaded about the access opening thereof, and in which there is a closure for said opening, having cooperable threads for removably securing it to the said housing.

5. The invention as defined in claim 4 in which the closure has a pivoted grip member for turning it, said member being movable between extended and retracted positions on the closure.

References Cited in the file of this patent

FOREIGN PATENTS 199,491   Austria _____ Sept. 10, 1958